United States Patent [19]

Feser

[11] 3,821,561

[45] June 28, 1974

[54] MULTISTAGE PULSE GENERATOR

[75] Inventor: Kurt Feser, Therwil, Switzerland

[73] Assignee: Emil Haefely & Cie. AG, Basle, Switzerland

[22] Filed: June 4, 1973

[21] Appl. No.: 366,859

[30] Foreign Application Priority Data

June 5, 1972 Switzerland.......................... 8294/72

[52] U.S. Cl. .................................. 307/110, 307/108

[51] Int. Cl. .............................................. H02m 3/18

[58] Field of Search ......... 307/108, 109, 110; 320/1

[56] References Cited

UNITED STATES PATENTS 3,501,646 3/1970 Bishop .................................. 307/110

*Primary Examiner*—Bernard Konick

*Assistant Examiner*—Stuart N. Hecker

*Attorney, Agent, or Firm*—Kurt Kelman

[57] ABSTRACT

An improved form of the multistage pulse generator described and claimed in U.S. Pat. No. 3,504,191 comprises a plurality of stages of capacitors, a first series of circuits each having a resistor for charging the capacitors in parallel, and a second series of circuits each having a spark gap therein for discharging the capacitors. The discharge circuit of each of the aforesaid second circuits has two parallel branches, the first of which is a high value resistance branch improved to include two series-connected resistance elements, and the second of which includes a series combination of a low value resistor and an auxiliary discharge device, the improvement being a low resistance voltage connection provided between the junction point of the two series-connected resistance elements of the first branch and the junction point between the low value resistor and the auxiliary discharge device of the second branch.

1 Claim, 1 Drawing Figure

MULTISTAGE PULSE GENERATOR

Figure 1:
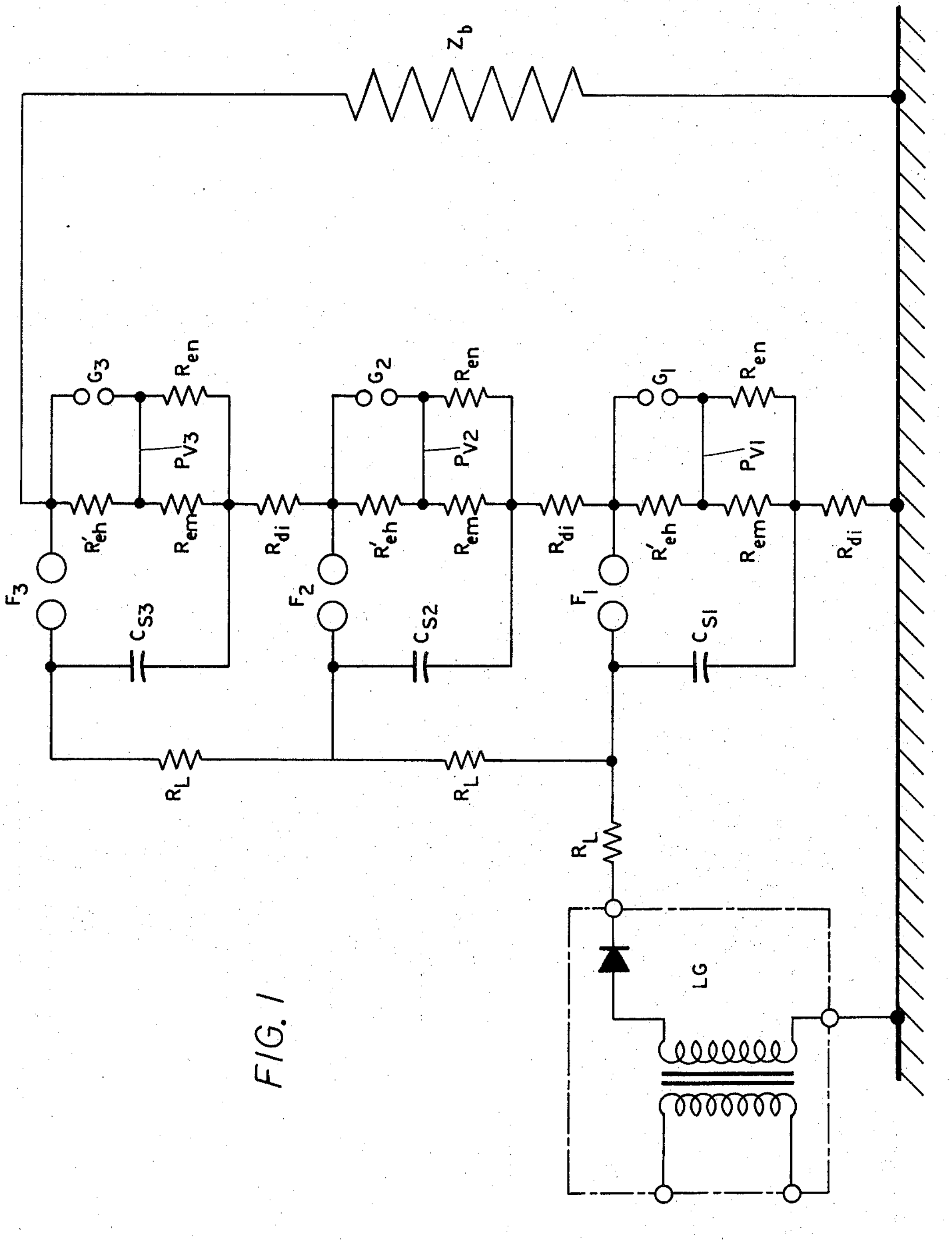

In U.S. Pat. No. 3,504,191 dated Mar. 31st, 1970 issued in the name of ARnold Rodewald and assigned together with the present application to a common assignee, there is described and claimed a multistage pulse generator comprising a plurality of stages of capacitors, a first series of circuits for said capacitors each having a resistor for charging up said capacitors in parallel, a second series of circuits each having a spark gap in series therein for discharging said capacitors; the discharge circuit of each of said second circuits comprising two parallel branches, the first of said branches having a high value resistor and the second of said branches having a series combination of a low value resistor and an auxiliary discharge device.

The present invention relates to an improved form of the multistage pulse generator described and claimed in the aforesaid U.S. Patent.

According to the invention a multistage pulse generator comprises a plurality of stages of capacitors, a first series of circuits for said capacitors each having a resistor for charging up said capacitors in parallel, and a second series of circuits each having a spark gap in series therein for discharging said capacitors, the discharge circuit of each of said second circuits comprising two parallel branches, the first of said branches being a high value resistance branch including two series-connected resistance elements and the second of said branches having a series combination of a low value resistor and an auxiliary discharge device, the discharge circuit of each of said second circuits further comprising a low resistance voltage connection between the junction point of said two series-connected resistance elements and the junction point between the low value resistor and the auxiliary discharge device of said second branch.

The invention will now be described, by way of example, with reference to the accompanying drawing, the single FIGURE of which is a circuit diagram of a multistage pulse generator in accordance with the invention.

Apart from the arrangement of the discharge circuit of each of the second circuits of the generator, the generator shown in the drawing includes the same items as the multistage pulse generator shown in FIG. 2 of the aforesaid U.S. Patent, and these items common to the two generators have been designated with the same reference characters. In order to avoid repetition, those parts of the circuit which are described in the aforesaid U.S. Patent will not be described in the present specification.

In each stage of the generator shown in the drawing, the high value resistor $R_{eh}$ of the circuit shown in FIG. 2 of the aforesaid U.S. Patent is replaced by two series-connected resistors $R'_{eh}$ and $R_{em}$. Between the junction point of these two resistors and the junction point of the low value resistor $R_{en}$ and its associated discharge device $G_1 - G_3$ there is provided a voltage connection $PV_1 - PV_3$. The resulting parallel connection of the high value resistor $R_{em}$ and the low value resistor $R_{en}$ forms, on the occasion of an arc-through of the discharge devices $G_1$, $G_2$ and $G_3$, the low ohmic resistance path for the tail of a flash surge voltage. The voltage drop across the high value discharge resistors $R'_{eh}$ causes a delay in flash-over of these parallel connected discharge devices $G_1$ to $G_3$, so that, after the overvoltages have built up and the series connection of all the capacitors of the spark gaps $F_1$ to $F_3$ has resulted, the high value resistor $R'_{eh}$ will be short-circuited by means of the discharge devices $G_1$ to $G_3$.

One of the resistors $R_{en}$ and $R_{em}$ of the said parallel connection may be infinitely large. Only the remaining resistor then determines the tail of the flash surge voltage.

What is claimed is:

1. A multistage pulse generator comprising a plurality of stages of capacitors, a first series of circuits for said capacitors each having a resistor for charging up said capacitors in parallel, and a second series of circuits each having a spark gap in series therein for discharging said capacitors, the discharge circuit of each of said second circuits comprising two parallel branches, the first of said branches being a high value resistance branch including two series-connected resistance elements and the second of said branches having a series combination of a low value resistor and an auxiliary discharge device, the discharge circuit of each of said second circuits further comprising a low resistance voltage connection between the junction point of said two series-connected resistance elements and the junction point between the low value resistor and the auxiliary discharge device of said second branch.

* * * * *